June 8, 1937.  R. R. APPLEGATE  2,083,309
METHOD AND APPARATUS FOR WELDING
Filed Jan. 9, 1935  2 Sheets-Sheet 1

Inventor
Robert R. Applegate
By Bates, Golrick, & Teare
Attorneys

June 8, 1937. R. R. APPLEGATE 2,083,309
METHOD AND APPARATUS FOR WELDING
Filed Jan. 9, 1935 2 Sheets-Sheet 2

Inventor
Robert R. Applegate
By Bates, Golrick, & Teare
Attorneys

Patented June 8, 1937

2,083,309

UNITED STATES PATENT OFFICE 2,083,309

METHOD AND APPARATUS FOR WELDING

Robert R. Applegate, Shaker Heights, Ohio

Application January 9, 1935, Serial No. 1,020

8 Claims. (Cl. 219—8)

This invention relates to a method of electric welding, to an electrode, and an apparatus for welding. Heretofore, welds having a satisfactory degree of ductility have necessitated a heavy coating on the electrode that is more or less frangible and difficult to penetrate. Accordingly, it has not been satisfactory for use with apparatus wherein the electrode is fed from a reel, downwardly through the head of a welding machine. The inability to maintain a current conducting contact between the contactor and electrode, therefore, has necessitated a dust-like covering for the electrode, which is far inferior to the heavily covered rod in the ductility of the resulting weld.

An object of my invention is to make an electrode, which can be fed through the head of a welding machine, and yet, which possesses the advantages of a heavily coated electrode. In addition my invention contemplates a method of welding, whereby electrodes may be made in rod form and fed through the head in progressive relationship without requiring them to be wound upon a reel. The disadvantage of winding a heavily coated electrode upon a reel is the fact that the coating will crack and chip off, whenever the electrode is bent at an angle that would be necessary to encircle a reel of the size that is customarily used on welding heads.

A further object of my invention is to provide a method and an article by means of which special alloys may be introduced into the weld during the operation of an electric welding machine and while an electrode is being fed continuously to the work.

Experience has shown in those electrodes, which have a bared portion extending longitudinally thereof, for engaging a contact roll, as the electrode is being fed through the head of a welding machine, that the arc flares outwardly adjacent the bared portion, and thereby results in an objectionable weld. My invention contemplates, in addition, therefore, the provision of means for closing the bared portion, while the electrode is being fed to the work, but after contact has been made between the electrode and the contact roll.

Figure 1:
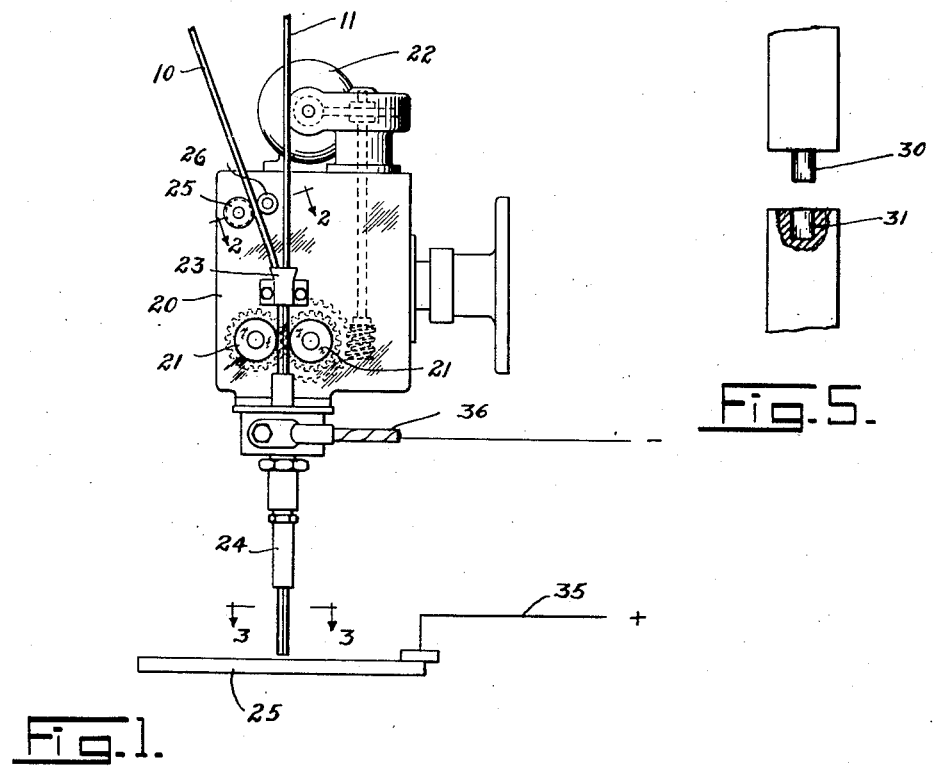
Figure 2:
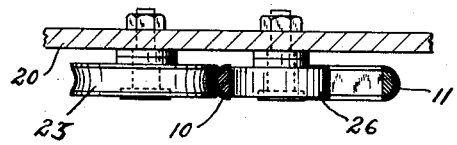
Figure 3:
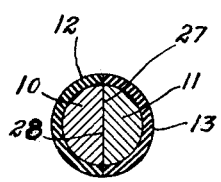
Figure 4:
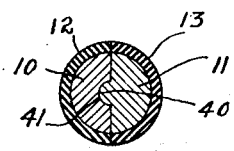
Figure 6:
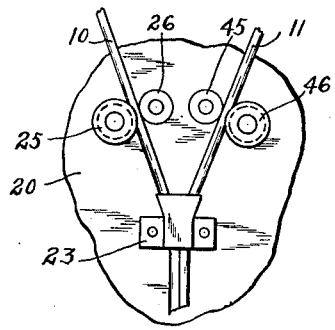
Figure 7:
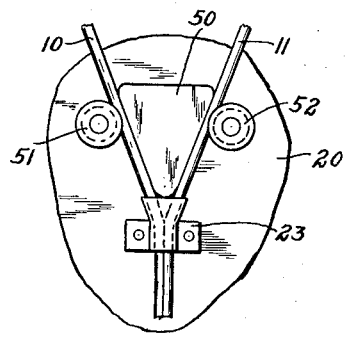
Figure 8:
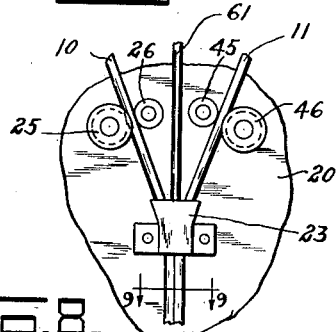
Figure 9:
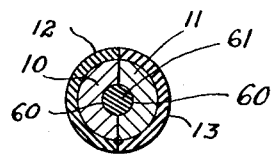
Figure 10:
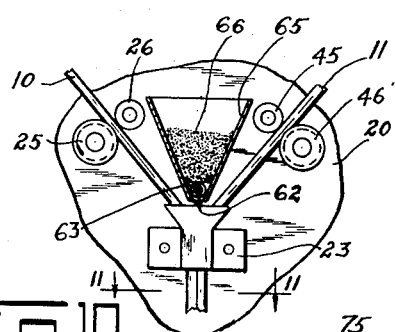
Figure 12:
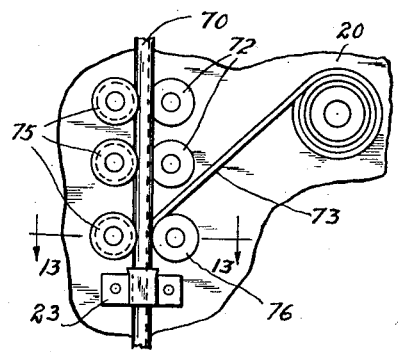
Figure 13:
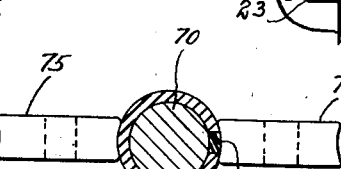
Figure 11:
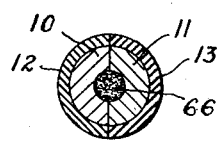

Referring now to the drawings, Fig. 1 is a diagrammatic view of a welding head having electrodes embodying my invention being fed therethrough; Figs. 2 and 3 are sections taken on the correspondingly numbered lines in Fig. 1; Fig. 4 is a section taken through the electrodes showing a modified form of construction; Fig. 5 is a sectional view through two electrodes to show the method of joining them to successive electrodes so as to assure continuous operation; Figs. 6 and 7 are modifications of the apparatus for conducting current to the electrodes; Fig. 8 is a fragmentary front view of a welding head, and illustrating a modification of my invention; Fig. 9 is a section taken on the line 9—9 in Fig. 8; Fig. 10 is a front view of part of a welding head, showing a further modification of my invention; Fig. 11 is a section taken on the line 11—11 in Fig. 10; Fig. 12 is a fragmentary view of a front of a welding head, illustrating my invention, as applied to a single electrode, having a bared strip extending throughout the length thereof, and Fig. 13 is a section taken on the line 13—13 in Fig. 12.

The electrodes which I propose to use are those which has a relatively heavy coating that is applied in the form of a sleeve to the electrode, and usually by an extruding process. I am not concerned in this application with the details of which the covering is made, is being sufficient to state that any commercial form of heavy covering may be utilized. In general my invention is practiced by utilizing two half-section bars which are only partially coated and which are brought together along the uncoated faces with the result that the half-sections cooperate to form a complete section that has a substantially continuous heavy covering at the line of weld. In Fig. 3 two half sections are indicated at 10 and 11, as having a coating indicated at 12 and 13. The coating extends only along the curved surfaces of the sections, and thereby forms a complete envelope for the electrode when they are fed together through a welding machine.

In Fig. 1 a conventional form of welding head is indicated at 20, as having feed rolls 21, which are driven through suitable gearing by an electric motor. The electrode sections are fed downwardly between the rolls through a hopper-shaped guide 23 that is carried by the head directly above the feed rolls, and thence through the tube 24 from whence they project in close proximity to the work 25. One of the half sections, in the arrangement illustrated in Fig. 1, is passed between a pressure roll 25 and a current conducting contactor roll 26 while the other electrode 11 is spaced from the contactor. The two electrodes are so positioned with reference to each other, however that the flat uncoated surfaces 28 and 27 are placed in facing and converging relationship, wherefore they are gradually brought together and pressed into current conducting relationship by the feed rolls 21.

Inasmuch as the heavy coated electrodes are not well suited for winding upon a reel, I propose to join successive electrodes in end to end relationship, while the machine is in operation, so as to insure continuity of operation thereof. One form of joint between successive electrodes is illustrated in Fig. 5 as a pin 30 on the end of one electrode, which fits snugly within a pocket 31 in the end of the preceding electrode. The electrodes can therefore, be made in convenient lengths for handling by the operator.

In the diagram shown in Fig. 1 one lead for the current is indicated at 35, as being electrically connected to the work, while the other lead is indicated at 36 as being connected through the head to the contactor roller 26. That portion of the conductor 36 which passes through the head is insulated from it.

In Fig. 4, I have shown a modification of the electrode construction, in which the meeting faces have a tongue and groove interconnection which operates to insure accurate alignment of the two sections, as they project from the welding head. In such illustration the electrode 11 has a tongue 40 while the electrode 10 has a coacting groove 41. The tongue and groove prevent any possible tendency for lateral misalignment of the electrodes during the welding operation.

In Fig. 1, I have shown a contacting roll, which engages only the member 10, but in Fig. 6, I have indicated another contactor roll 45, and pressure roll 46, between which the electrode section 11 is arranged to pass. This additional contactor is intended for use with those electrodes, which are apt to have a thin imperceptible film on the contacting face that might interfere with the proper conductivity of current from one electrode to the other.

In Fig. 7, I have shown still another modification of the contactor arrangement in which the contactor is in the form of a wedge-shaped member 50 that is disposed between the electrode sections 10 and 11, and which operates to feed current simultaneously into both sections. In such arrangement, two pressure rolls 51 and 52 are disposed outside the sections to cooperate with the passageways between which the sections are passed.

An important advantage of the present invention is the fact that welds of the desired degree of ductility can be obtained with a welding machine. Furthermore, the invention is readily adapted for use with existing welding machines without necessitating extensive changes in the construction thereof, and does not necessitate piercing of the coating at any point during the feeding operation.

To introduce alloys or other chemicals into the region of the arc and during the welding operation, I may provide an arrangement, such as is shown in Fig. 8, wherein each of the electrode sections has a groove 60 on the bared flat surface thereof. Such grooves cooperate to provide a cylindrical passageway through the electrode when the two sections are in abutting engagement. A rod 61 containing the alloy or other material, which the operator desires to introduce into the arc, is then fed downwardly into the passageway, and continuously with the electrodes.

In Fig. 10, the material to be fed into the arc is illustrated in the form of a powder, instead of a rod, and in such modification, the material 66 may be held in a hopper 65 that is carried by the head between the two sections of the electrode, and the powder may be allowed to drop into the opening 62 at any predetermined rate in accordance with the setting of a manually operable valve 63.

In Fig. 13, I have illustrated a one-piece electrode 70, which is bared longitudinally, as at 71, for permitting engagement with a contactor roll 72. Inasmuch as the bared portion is continuous, the arc flares outwardly and laterally at such region, and so I propose to close or seal the bared strip, by introducing material in the form of a flexible cord 73 that is sufficient in bulk to substantially fill the recess in the electrode, and I feed such strip into the recess after contact has been made between the electrode and roll. Thus, the electrode projects from the welding head in the same manner, as one which is coated with a continuous sleeve, and as a result, the arc is confined within the desired limits. To guide the electrode, I have shown pressure rolls 75 on one side, and a roll 76 on the opposite side. The cord 73 then may be fed into the groove at a point between the lowermost contact roll 72 and the pressure roll 76.

I therefore claim:—

1. A method of feeding electrode sections to an arc comprising passing two electrode sections that are coated except for a longitudinally extending strip, through the head of a welding machine, applying current to one of the sections and joining the two sections together along the uncoated strips.

2. A method of feeding electrode sections to an arc comprising feeding two partially coated electrode sections through the head of a welding machine, feeding current into one of the sections along the uncoated part thereof and thereafter bringing the uncoated surfaces of the two sections into abutting engagement, whereby the coated portions provide a substantially continuous envelope at the point of weld.

3. A method of feeding electrode sections to an arc, comprising taking two half sections of solid weld metal and coating them in a lengthwise direction except for a strip extending longitudinally and for the entire length thereof, feeding two such sections into converging relationship with the uncoated strips in mutual engagement through the head of a welding machine and holding the electrodes in such position during the feeding operation that the uncoated strips are forced into current conducting relationship, whereby the two sections cooperate to form a single electrode that has a substantially continuous coating on the exterior surface thereof.

4. An apparatus for electric welding comprising in combination, a welding head, feed rolls thereon, said rolls being spaced in sufficient proximity to each other to force two sections of an electrode into abutting side by side current conducting relationship, means for rotating the rolls, and a current conducting roll engaging one of the electrode sections, in advance of the point of contact between the sections.

5. An apparatus for electric welding, comprising in combination, a welding head, a pair of feed rolls carried thereby, said rolls operating to force two electrode sections into current conducting relationship, and a pair of rolls spaced above the feed rolls and engaging at least one of the sections, one of the last mentioned rolls comprising a contactor for conducting current to the sections.

6. An apparatus for electric welding comprising in combination, a welding head, means for feeding two sections of an electrode therethrough, and a contactor roll engaging one of the sections at one side of said means.

7. An electric welding apparatus comprising in combination, a welding head, two electrode sections, means for moving them in a converging relationship so as to form a single section just prior to entering the arc area and a contactor engaging at least one of the sections on the inner side thereof, and at a point where the sections are separated.

8. An electric welding apparatus comprising in combination a welding head, feed rolls on the head for engaging two electrode sections and forcing them through the head, and a wedge shape contactor carried by the head and engaging the sections in advance of the rolls, and means for forcing each of the sections into engagement with the contactor.

ROBERT R. APPLEGATE.